(No Model.)
T. A. EDISON.
DYNAMO ELECTRIC MACHINE.
No. 297,583. Patented Apr. 29, 1884.
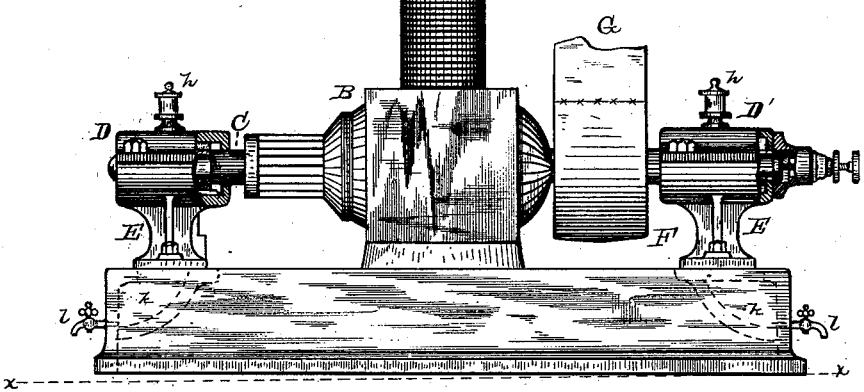
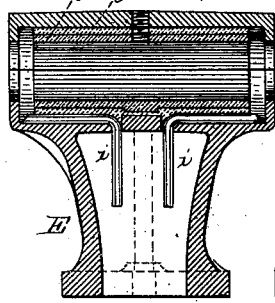
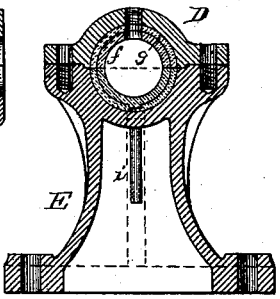
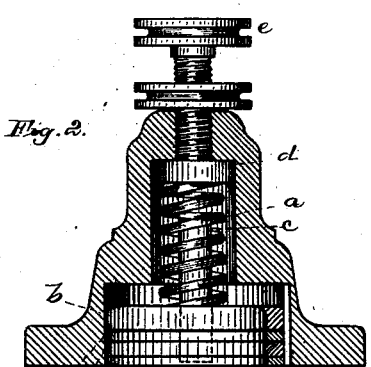
ATTEST:
E. E. Rowland
H. W. Seely
INVENTOR:
Thomas A. Edison
By Rich'd N. Dyer
Att'y.

UNITED STATES PATENT OFFICE.

THOMAS A. EDISON, OF MENLO PARK, NEW JERSEY.

DYNAMO-ELECTRIC MACHINE.

SPECIFICATION forming part of Letters Patent No. 297,583, dated April 29, 1884.

Application filed October 10, 1883. (No model.)

*To all whom it may concern:*

Be it known that I, THOMAS A. EDISON, of Menlo Park, in the county of Middlesex and State of New Jersey, have invented a new and useful Improvement in Dynamo-Electric Machines, (Case No. 587,) of which the following is a specification.

This invention relates to the bearings in which the armature-shaft of a dynamo-electric machine is supported, my objects being to produce an even wear upon the journals, preventing grooves from being worn therein; to produce also an even wear upon the commutator-cylinder of the machine; to produce an effectual lubrication by distributing the oil over the whole length of the journals, and to retain the surplus oil which runs down from the bearings, instead of allowing it to drip over the sides of the pillow-blocks upon the floor.

In carrying out my invention I so support the armature-shaft that it is free to move slightly in either longitudinal direction. There will then be a slight oscillation of the shaft back and forth in its bearings, caused by the jar of running the machine, or from other causes. This oscillation works the oil along the whole length of the journals, so as to produce an even lubrication, and also prevents any grit or hard particles from remaining in one place and wearing grooves in the journals. The commutator-brushes also do not bear always on the same part of the commutator-cylinder, and hence do not wear away the cylinder in grooves. I provide also tubes or passages leading from the journal-boxes down into the pillow-blocks, so that the oil which accumulates at the ends of the bearings runs down through such passages into receptacles formed for it in the bed-plate, such receptacles being provided with cocks for drawing the oil off when they become full. The balanced supporting of the armature-shaft is preferably accomplished by placing the machine at a slight angle from a vertical position, so that the shaft would tend to slide toward one end, and placing a spring at that end so adjusted as to just balance this sliding tendency. The shaft will then have a slight oscillation, as above explained. The balancing might, however, be done by inclining the machine as before, and so aligning the machine and the engine which drives it that the belt will tend to resist the sliding down of the shaft, the spring being dispensed with. It is evident, however, that the spring is preferable.

In the annexed drawings, Figure 1 is a view in elevation of the machine with the ends of the bearings shown in section; Fig. 2, a view of the spring which presses against one end of the shaft; Fig. 3, a longitudinal section of one of the bearings, and Fig. 4 a cross-section thereof.

A is the field-magnet, and B the armature of the machine. C is the armature-shaft. D D' are the journal-boxes, and E E are the pillow-blocks. F is the pulley, and G the belt which runs to said pulley from the driving-motor.

The machine is set at an angle from the vertical. I have indicated this in the drawings by the dotted line $x\ x$, which would represent the floor-line were the inclination produced by raising one end of the bed-plate. It is to be understood, however, that the angle indicated by this line is much greater than that at which the machine is in reality placed, and is shown merely to illustrate the fact that the machine is inclined. The real angle is so small that it could not be shown in a drawing of this size, as the very least inclination of the machine is sufficient to accomplish the desired object; also, it is to be understood that the above is not the method which I prefer to employ for inclining the machine. Preferably one end of the bed-plate is made a trifle thicker than the other, or the pedestal of one journal-box is raised to a slight extent higher than the other, or the inclination is produced in some other manner in the construction of these stationary parts. The inclination of the machine causes a tendency on the part of the shaft to slide down toward the journal-box D'. To balance the shaft against this tendency, the spring $a$ is made to bear against the end of the shaft through alternate washers $b\ b'$, of metal and fiber or leather, the last washer $b'$ bearing directly against the end of the shaft. The rod $c$ turns through all these washers except the last, and the spring $a$ is coiled around this rod between the washers and the collar $d$. The pressure of the spring upon the shaft is adjusted by turning the rod $c$, it being provided with thumb-screw $e$ for this purpose. The spring is thus adjusted to balance the downward tendency of the shaft, and said shaft is thus allowed to move slightly back and forth, with the result already specified. The journal-boxes are made, as usual, in two parts bolted together, and are lined, preferably, with phosphor-bronze $f$ and Babbitt metal $g$. From the oil-cups $h\ h$ the oil descends upon the journals and lubricates them evenly in every part. The oil accumulates at the ends of the bearings, and thence runs off through the pipes $i\ i$, which extend into the hollow pillow-blocks, and drops off into the receptacles $k\ k$, which are formed for this purpose in the bed-plate, the latter being in the form of an open-ribbed frame, as set forth in my application, Serial No. 99,553. Such receptacles are provided with cocks $l\ l$, by which the oil is withdrawn.

It is evident that most of the improvements herein described are applicable to machines other than electrical generators.

It is to be understood that all patentable features of invention shown or described, but not claimed herein, are reserved for protection by other patents, and have been or will be embodied in other applications for patents.

What I claim is—

1. In a dynamo-electric machine driven by a belt, the shaft balanced in its bearings, and free to move in either longitudinal direction, substantially as set forth.

2. The combination, with a dynamo-electric machine driven by a belt, of means tending to move the shaft of the machine longitudinally in one direction, and means acting with equal force to move it in the opposite direction, substantially as set forth.

3. The combination, with a dynamo-electric machine driven by a belt, of a spring bearing against an end of the armature-shaft, substantially as set forth.

4. In a dynamo-electric machine driven by a belt, the combination of a spring bearing against an end of the shaft of the machine, and means tending to move said shaft against said spring, substantially as set forth.

5. A belt-driven dynamo-electric machine placed at a slight angle from a vertical position, and provided with means resisting the consequent sliding tendency of the shaft of the machine, substantially as set forth.

6. A belt-driven dynamo-electric machine placed at a slight angle from a vertical position, and provided with a spring bearing against the lower end of its shaft, substantially as set forth.

7. In a dynamo-electric machine driven by a belt, the combination of an adjustable spring bearing against an end of the shaft of the machine, and means tending to move said shaft against said spring, substantially as set forth.

8. The combination, with a dynamo-electric machine, of a bed-plate therefor, formed as an open-ribbed frame, one or more oil-receptacles within said bed-plate, and one or more ducts leading from the journal-boxes to said receptacles, substantially as set forth.

This specification signed and witnessed this 27th day of July, 1883.

THOS. A. EDISON.

Witnesses:
H. W. SEELY,
EDWARD H. PYATT.